US012676639B2

(12) United States Patent
Zhou et al.

(10) Patent No.: US 12,676,639 B2
(45) Date of Patent: Jul. 7, 2026

(54) ELECTRONIC DEVICE AND ANTENNA CONTROL METHOD

(71) Applicant: REALTEK SEMICONDUCTOR CORPORATION, Hsinchu (TW)

(72) Inventors: Jian-Jun Zhou, Suzhou (CN); Jie-Hong Yu, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 469 days.

(21) Appl. No.: 18/201,997

(22) Filed: May 25, 2023

(65) Prior Publication Data

US 2023/0421181 A1    Dec. 28, 2023

(30) Foreign Application Priority Data

Jun. 27, 2022    (CN) .......................... 202210733751.9

(51) Int. Cl.
*H04W 48/18* (2009.01)
*H04B 1/00* (2006.01)
*H04B 1/04* (2006.01)

(52) U.S. Cl.
CPC ........... *H04B 1/006* (2013.01); *H04B 1/0067* (2013.01); *H04B 1/04* (2013.01)

(58) Field of Classification Search
CPC ........ H04B 1/006; H04B 1/0067; H04B 1/04; H04B 1/401; H01Q 1/22
USPC ...................................... 455/552.1
See application file for complete search history.

(56) References Cited

U.S. PATENT DOCUMENTS

| | | | |
|---|---|---|---|
| 11,039,457 B2 | 6/2021 | Kencharla | |
| 2007/0197256 A1 | 8/2007 | Lu | |
| 2009/0137206 A1 | 5/2009 | Sherman | |
| 2009/0285167 A1 | 11/2009 | Hirsch | |
| 2010/0008338 A1* | 1/2010 | Tsfati ................... | H04B 1/0067 455/41.2 |
| 2012/0329395 A1* | 12/2012 | Husted ................ | H04B 1/0057 455/552.1 |

(Continued)

FOREIGN PATENT DOCUMENTS

| | | |
|---|---|---|
| CN | 112335314 A | 2/2021 |
| TW | 202226878 A | 7/2022 |

OTHER PUBLICATIONS

OA letter of U.S. Appl. No. 18/202,020 mailed on Sep. 23, 2025.

*Primary Examiner* — Tanmay K Shah
(74) *Attorney, Agent, or Firm* — WPAT, PC

(57) ABSTRACT

An electronic device and an antenna control method are provided. The electronic device includes an antenna, a line switching circuit, a first communication chip, a second communication chip, and a logic circuit. The line switching circuit is coupled to the antenna. The first communication chip is coupled to the antenna through the line switching circuit and configured to generate a slot allocation signal. The second communication chip is coupled to the antenna through the line switching circuit and configured to generate a packet transceiving request signal. The first communication chip and the second communication chip are communication chips of different types. The logic circuit is coupled to the first communication chip and the second communication chip and configured to control the line switching circuit according to the slot allocation signal and the packet transceiving request signal.

16 Claims, 13 Drawing Sheets

(56) References Cited

U.S. PATENT DOCUMENTS

2023/0238994 A1  7/2023  Lin

* cited by examiner

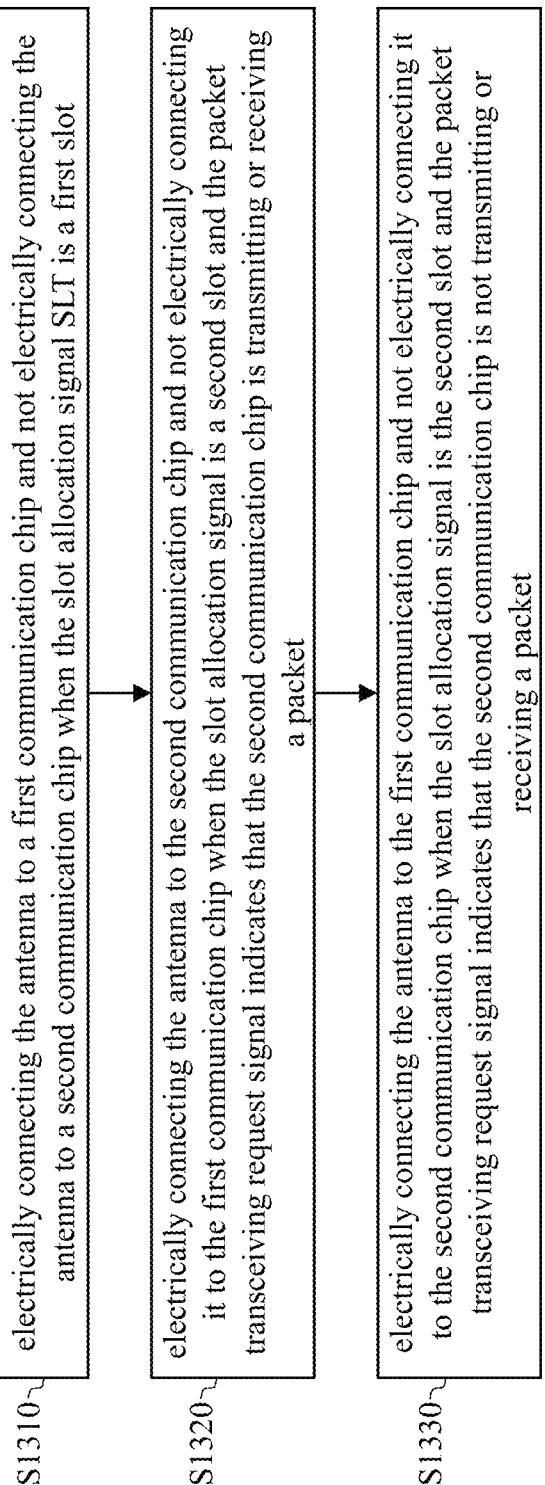

S1310   electrically connecting the antenna to a first communication chip and not electrically connecting the antenna to a second communication chip when the slot allocation signal SLT is a first slot S1320   electrically connecting the antenna to the second communication chip and not electrically connecting it to the first communication chip when the slot allocation signal is a second slot and the packet transceiving request signal indicates that the second communication chip is transmitting or receiving a packet S1330   electrically connecting the antenna to the first communication chip and not electrically connecting it to the second communication chip when the slot allocation signal is the second slot and the packet transceiving request signal indicates that the second communication chip is not transmitting or receiving a packet

FIG. 13

ELECTRONIC DEVICE AND ANTENNA CONTROL METHOD

BACKGROUND OF THE INVENTION

1. Field of the Invention

The present invention generally relates to antenna sharing among multiple wireless communication protocols.

2. Description of Related Art

In recent years, the update and emergence of new generations of various wireless communication protocols are fast, which continuously drives the progress of technology and updates of products, contributing to rapid growth of the Internet of Things (IoT) industry. Due to the limitation of volume and consideration of product cost, most of the wireless communication products use a single antenna for the operations of multiple wireless communication protocols. For example, smart watches or bands involve two communication protocols: wireless local area network (WLAN) and Bluetooth; smart gateways involve two communication protocols: Thread and Bluetooth or Zigbee and Bluetooth.

Therefore, in IoT products that have only one antenna, it is crucial to control the antenna in a way that ensures multiple wireless communication protocols to function properly.

SUMMARY OF THE INVENTION

In view of the issues of the prior art, an object of the present invention is to provide an electronic device and an antenna control method, so as to make an improvement to the prior art.

According to one aspect of the present invention, an electronic device is provided. The electronic device includes an antenna, a line switching circuit, a first communication chip, a second communication chip, and a logic circuit. The line switching circuit is coupled to the antenna. The first communication chip is coupled to the antenna through the line switching circuit and configured to generate a slot allocation signal. The second communication chip is coupled to the antenna through the line switching circuit and configured to generate a packet transceiving request signal. The first communication chip and the second communication chip are communication chips of different types. The logic circuit is coupled to the first communication chip and the second communication chip and configured to control the line switching circuit according to the slot allocation signal and the packet transceiving request signal.

According to another aspect of the present invention, an antenna control method of switching an antenna to a first communication chip or a second communication chip is provided. The first communication chip outputs a slot allocation signal. The second communication chip outputs a packet transceiving request signal. The first communication chip and the second communication chip are communication chips of different types. The method includes the following steps: electrically connecting the antenna to the first communication chip and not electrically connecting the antenna to the second communication chip when the slot allocation signal corresponds a first slot; and electrically connecting the antenna to the second communication chip and not electrically connecting the antenna to the first communication chip when the slot allocation signal corresponds a second slot and the packet transceiving request signal indicates that the second communication chip is transmitting or receiving a packet.

The technical means embodied in the embodiments of the present invention can solve at least one of the problems of the prior art. Therefore, compared with the prior art, the present invention can properly control the antenna so that various wireless communication protocols can function as expected.

These and other objectives of the present invention no doubt become obvious to those of ordinary skill in the art after reading the following detailed description of the preferred embodiments with reference to the various figures and drawings.

BRIEF DESCRIPTION OF THE DRAWINGS

FIG. 13 is a flowchart of an antenna control method according to an embodiment of the present invention.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes electronic devices and antenna control methods. On account of that some or all elements of the electronic devices could be known, the detail of such elements is omitted provided that such detail has little to do with the features of this disclosure, and that this omission nowhere dissatisfies the specification and enablement requirements. Some or all of the processes of the antenna control methods may be implemented by software and/or firmware and can be performed by the electronic devices or their equivalents. A person having ordinary skill in the art can choose components or steps equivalent to those described in this specification to carry out the present invention, which means that the scope of this invention is not limited to the embodiments in the specification.

Figure 1:
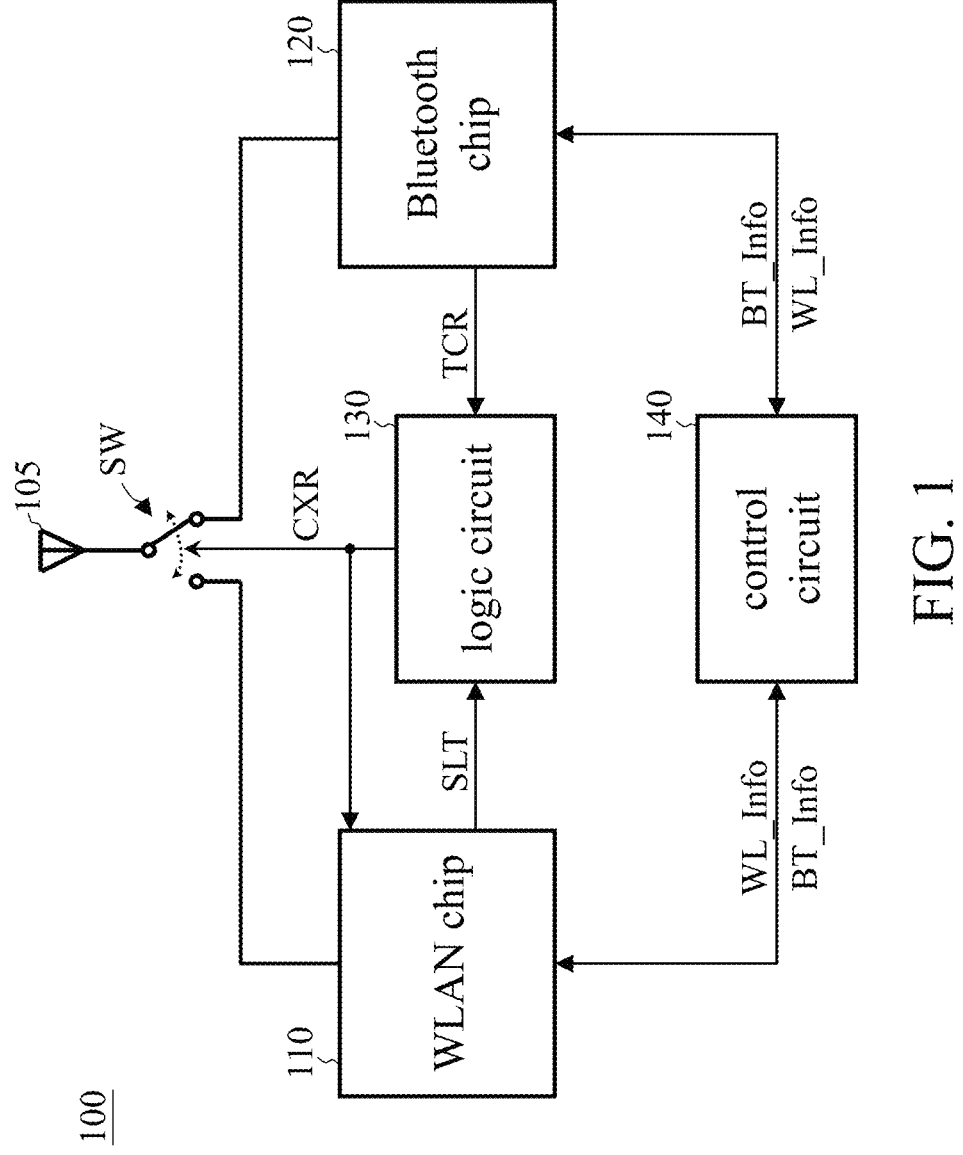
FIG. 1 is a functional block diagram of the electronic device according to an embodiment of the present invention.

FIG. 1 is a functional block diagram of the electronic device according to an embodiment of the present invention. The electronic device 100 includes an antenna 105, a line switching circuit SW, a WLAN chip 110, a Bluetooth chip 120, a logic circuit 130, and a control circuit 140. The WLAN chip 110 outputs a slot allocation signal SLT to the logic circuit 130. The Bluetooth chip 120 outputs a packet transceiving request signal TCR to the logic circuit 130. The logic circuit 130 generates an antenna control signal CXR according to the slot allocation signal SLT and the packet transceiving request signal TCR. The line switching circuit SW switches the antenna 105 to the WLAN chip 110 (i.e., to electrically connect the antenna 105 to the WLAN chip 110 but not to the Bluetooth chip 120, so that the antenna 105 is used by the WLAN chip 110) or to the Bluetooth chip 120 (i.e., to electrically connect the antenna 105 to the Bluetooth chip 120 but not to the WLAN chip 110, so that the antenna 105 is used by the Bluetooth chip 120 instead) according to the antenna control signal CXR. The WLAN chip 110 also operates according to the antenna control signal CXR. The line switching circuit SW can be embodied by a switch, a multiplexer, or an equivalent thereof. However, it should be understood that although the line switching circuit SW in this embodiment seems to be embodied by a physical switch and disconnection circuit, in other embodiments, the electrical connection relationship that only one of the WLAN chip 110 and the Bluetooth chip 120 uses the antenna 105 at a given time can be implemented through other feasible manners.

The control circuit 140 receives from the WLAN chip 110 the operation information of the WLAN chip 110 (i.e., the WLAN chip information WL_Info) and receives from the Bluetooth chip 120 the operation information of the Bluetooth chip 120 (i.e., the Bluetooth chip information BT_Info), and provides the WLAN chip information WL_Info and the Bluetooth chip information BT_Info to the Bluetooth chip 120 and the WLAN chip 110, respectively. As a result, the WLAN chip 110 can operate according to the Bluetooth chip information BT_Info, and the Bluetooth chip 120 can operate according to the WLAN chip information WL_Info. The WLAN chip information WL_Info includes the current status of the WLAN chip 110, such as connected, disconnected, or scanning. The Bluetooth chip information BT_Info includes the current operating profile of the Bluetooth chip 120, such as the Advance Audio Distribution Profile (A2DP), or the Hands-Free Profile (HFP).

Figure 2:
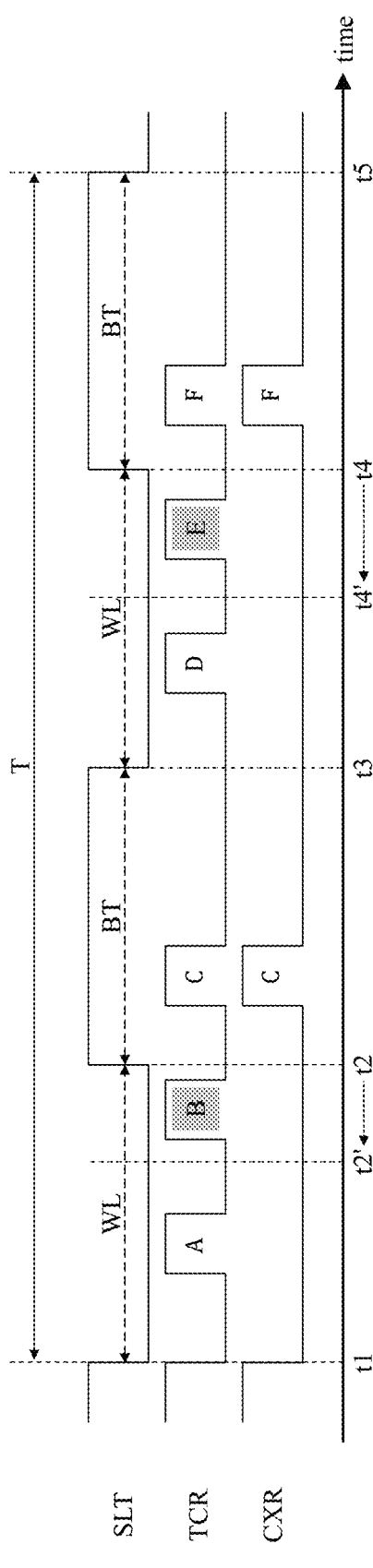
FIG. 2 is a timing diagram according to an embodiment of the present invention.

Reference is made to FIG. 2, which is a timing diagram according to an embodiment of the present invention. Within a period T, the slot allocation signal SLT includes four slots: the slot WL (which is between the time point t1 and the time point t2, and during which the slot allocation signal SLT is at a low level), the slot BT (which is between the time point t2 and the time point t3, and during which the slot allocation signal SLT is at a high level), the slot WL (which is between the time point t3 and the time point t4, and during which the slot allocation signal SLT is at the low level), and the slot BT (which is between the time point t4 and the time point t5, and during which the slot allocation signal SLT is at the high level). The slot WL and the slot BT appear alternately.

In some embodiments, a period T may contain more slots (e.g., 6, 8 or more) or fewer slots (e.g., 2, that is, one slot WL and one slot BT).

In some embodiments, the WLAN chip 110 generates the slot allocation signal SLT according to a time point at which the beacon is received. More specifically, the WLAN chip 110 generates an interrupt a short period of time (e.g., hundreds of microseconds) before a preset beacon reception time point, and the WLAN chip 110 pulls down the slot allocation signal SLT after the generation of the interrupt (for example at the time point t1, the time point t3, and the time point t5), and pulls up the slot allocation signal SLT after a predetermined period of time (for example, after the time length of t241 and t4-t3). The predetermined period of time can be fixed (i.e., t2-t1 and t4-t3 are fixed values) or not fixed (i.e., t241 and t4-t3 are not fixed values).

The packet transceiving request signal TCR being at a high level mean that the Bluetooth chip 120 transmits or receives packets. In the example of FIG. 2, the Bluetooth chip 120 transmits or receives 6 packets in the period T: packet A, packet B, packet C, packet D, packet E, and packet F, with the packets A, B, D and E falling within the slot WL, while the packets C and F falling within the slot BT.

The antenna control signal CXR is the intersection of the slot allocation signal SLT and the packet transceiving request signal TCR. That is, if the slot allocation signal SLT and the packet transceiving request signal TCR are both at the high level, the antenna control signal CXR is at the high level; otherwise, the antenna control signal CXR is at the low level. When the antenna control signal CXR is at the low level, the logic circuit 130 controls the line switching circuit SW to switch the antenna 105 to the WLAN chip 110. When the antenna control signal CXR is at the high level, the logic circuit 130 controls the line switching circuit SW to switch the antenna 105 to the Bluetooth chip 120. In other words, in the slot BT, the logic circuit 130 switches the antenna 105 to the Bluetooth chip 120 only when the Bluetooth chip 120 needs to transmit or receive packets (e.g., packets C and F); at other times in the slot BT (i.e., when the slot allocation signal SLT is at the high level and the antenna control signal CXR is at the low level), the logic circuit 130 switches the antenna 105 to the WLAN chip 110 to better utilize the antenna. From the antenna control signal CXR, the WLAN chip 110 learns the time in the slot BT at which the antenna 105 is assigned to the WLAN chip 110 (i.e., the time when the slot allocation signal SLT is at the high level and the antenna control signal CXR is at the low level).

In some embodiments, packet B and packet E are periodic packets, such as packets related to Bluetooth Low Energy (BLE) or enhanced Synchronous Connection Oriented (eSCO). When the aforementioned predetermined period of time is not fixed (e.g., the length of the slot WL becomes t2'-t1 or t4'-t3 in the next period), it is likely that the Bluetooth chip 120 transmits or receives packet B and packet E. In some embodiments, packet B and packet E may be regarded as critical packets.

Figure 3:
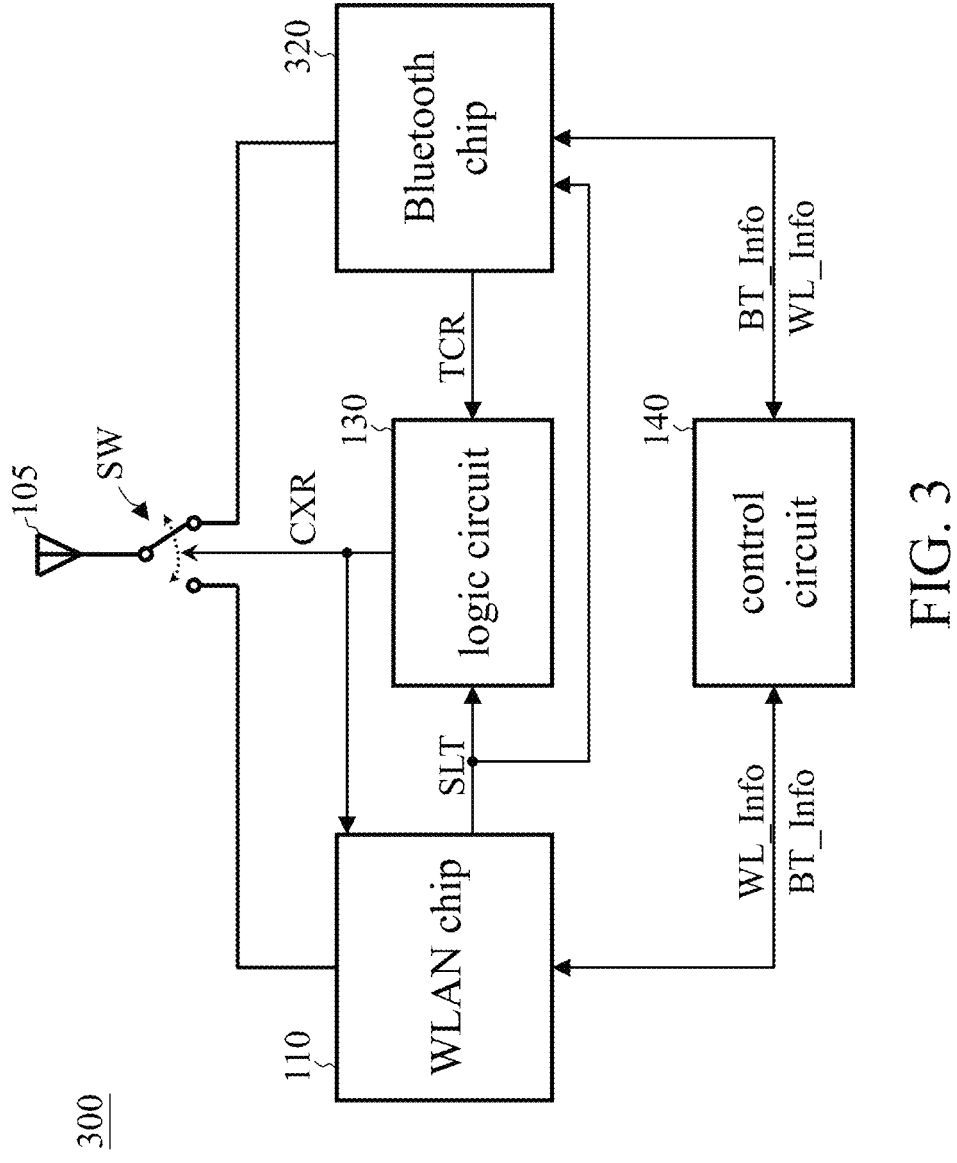
FIG. 3 is a functional block diagram of the electronic device according to another embodiment of the present invention.

FIG. 3 is a functional block diagram of the electronic device according to another embodiment of the present invention. The electronic device 300 includes the WLAN chip 110, a Bluetooth chip 320, the logic circuit 130, and the control circuit 140. The Bluetooth chip 320 receives the slot allocation signal SLT and generates a packet transceiving request signal TCR according to the slot allocation signal SLT.

Figure 4:
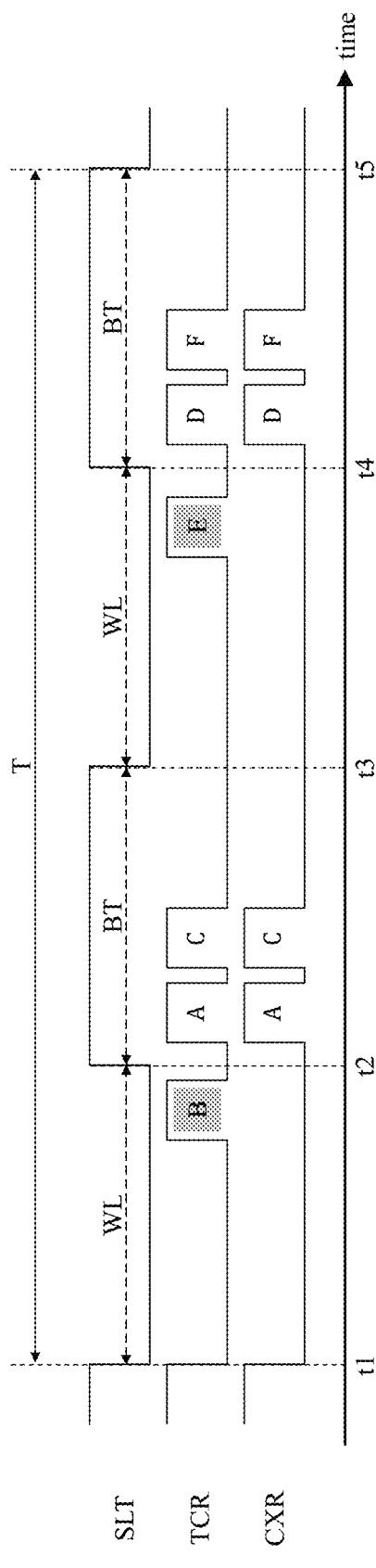
FIG. 4 is a timing diagram according to another embodiment of the present invention.

Reference is made to FIG. 4, which, according to another embodiment of the present invention, is a timing diagram corresponding to the electronic device 300 in FIG. 3. In comparison with the embodiments of FIG. 1 and FIG. 2, the Bluetooth chip 320 move packets A and D from the slot WL (FIG. 2) to the slot BT (FIG. 4) by redistributing or rearranging the packets according to the slot allocation signal SLT. As a result, the Bluetooth chip 320 can transmit or receive packets A and D in the slot BT. In other words, in the embodiment according to FIG. 3 and FIG. 4, the Bluetooth chip 320 learns the distributions of slots from the slot allocation signal SLT and arranges the packets that can be adjusted and arranged (i.e., packet A, packet C, packet D, and packet F) in the slot BT to effectively use the slot BT to transmit or receive as many packets as possible.

In some embodiments, the Bluetooth chip 320 uses a state machine, in cooperation with hardware, to implement packet adjustment and/or arrangement. In some other embodiments, the Bluetooth chip 320 uses software to implement packet adjustment and/or arrangement. In other words, there are many ways to implement packet adjustment and/or arrangement.

In some embodiments, the timing diagrams in FIG. 2 and FIG. 4 correspond to the WLAN chip 110 being in the process of scanning or establishing a connection.

In some embodiments, the logic circuit 130 is formed by logic circuits, such as AND gates, OR gates, NOT gates, or a combination thereof.

Figure 5:
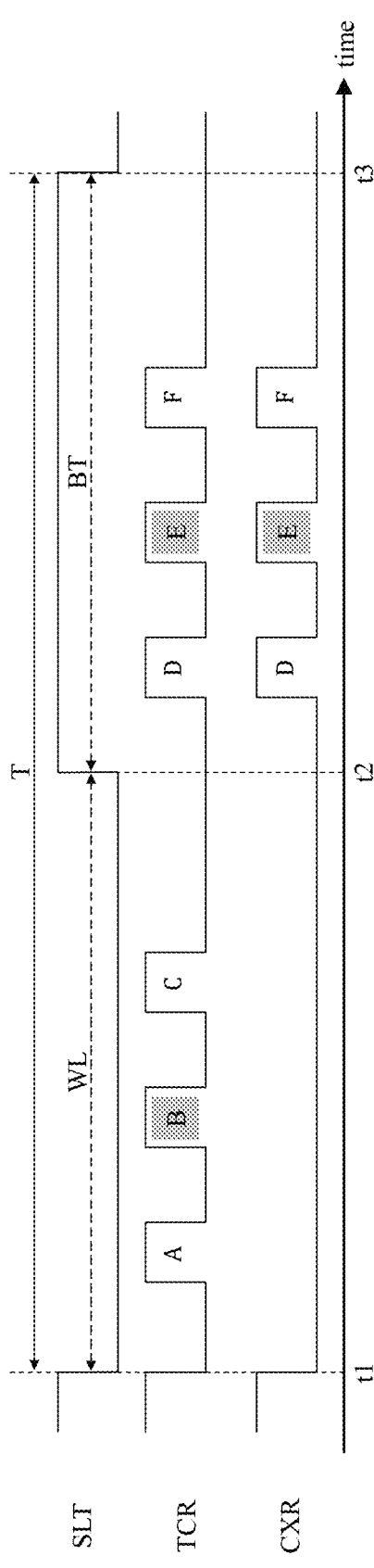
FIG. 5 is a timing diagram according to another embodiment of the present invention.
Figure 6:
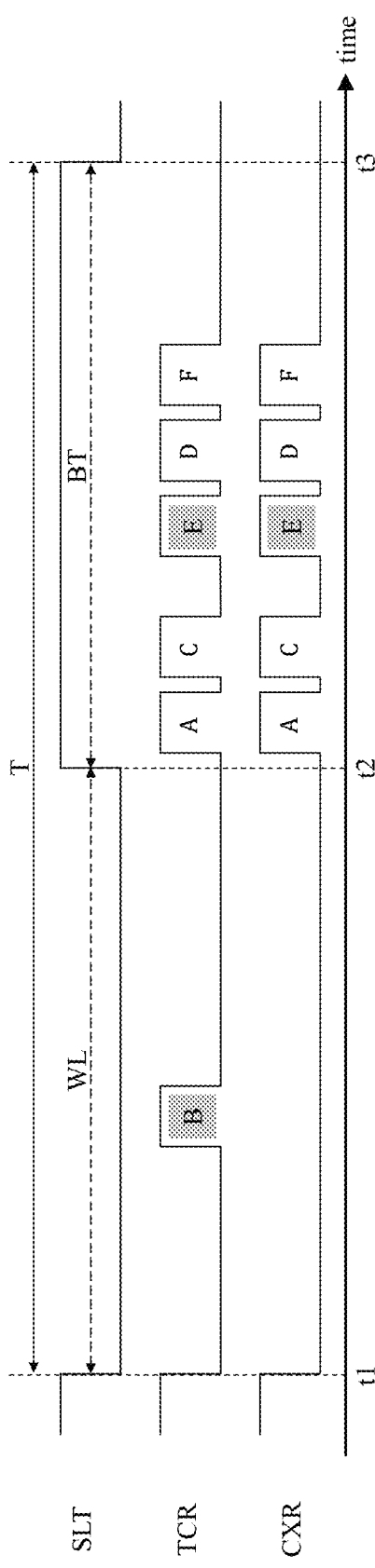
FIG. 6 is a timing diagram according to another embodiment of the present invention.

Reference is made to FIG. 5 and FIG. 6, which are timing diagrams according to another embodiment of the present invention. The timing diagrams in FIG. 5 and FIG. 6 correspond to the Bluetooth chip 120 (or the Bluetooth chip 320) operating according to the A2DP. FIG. 5 corresponds to the electronic device 100 (of which the Bluetooth chip 120 does not receive the slot allocation signal SLT), and FIG. 6 corresponds to the electronic device 300 (of which the Bluetooth chip 320 receives the slot allocation signal SLT). The difference between FIG. 5 and FIG. 6 is that the Bluetooth chip 320 redistributes or rearranges the packets to effectively use the slot BT to transmit or receive as many packets as possible.

In the examples of FIG. 5 and FIG. 6, a period T contains two slots; however, in other embodiments, a period T may contain more slots. The antenna control signal CXR is still the intersection of the slot allocation signal SLT and the packet transceiving request signal TCR. When the antenna control signal CXR is at the low level (including the entire slot WL and some of the slot BT), the antenna 105 is used by the WLAN chip 110; when the antenna control signal CXR is at the high level (including some of the slot BT), the antenna 105 is used by the Bluetooth chip 120 (or the Bluetooth chip 320).

Similarly, in the examples of FIG. 5 and FIG. 6, the length of the slot WL may be fixed or not fixed. When the length of the slot WL is not fixed, it is likely that the Bluetooth chip 120 (or the Bluetooth chip 320) transmits or receives packet B.

Figure 7:
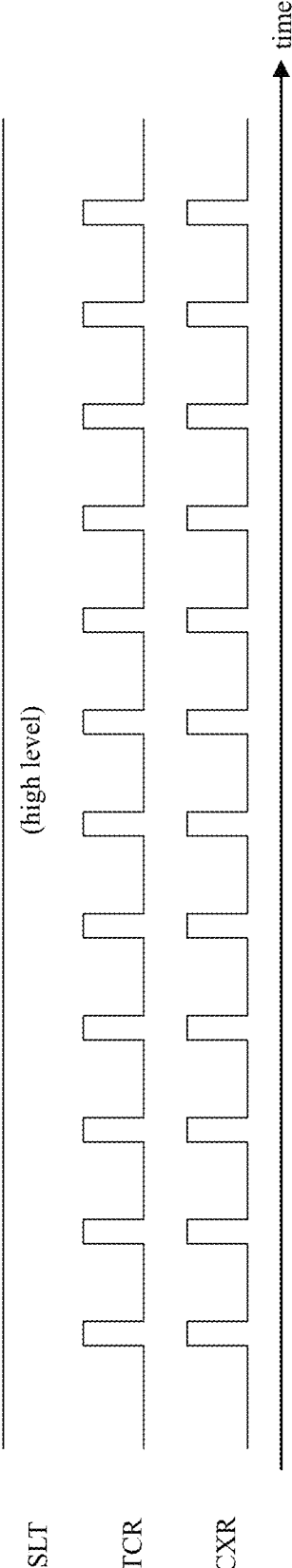
FIG. 7 is a timing diagram according to another embodiment of the present invention.

Reference is made to FIG. 7, which is a timing diagram according to another embodiment of the present invention. The timing diagram of FIG. 7 corresponds to the Bluetooth chip 120 (or the Bluetooth chip 320) operating according to the HFP. When the WLAN chip 110 learns from the Bluetooth chip information BT_Info that the Bluetooth chip 120 (or the Bluetooth chip 320) is operating according to the HFP, the WLAN chip 110 controls the slot allocation signal SLT to be at the high level (which is an equivalent of all slots being the slot BT); as a result, the antenna control signal CXR is identical to the packet transceiving request signal TCR, meaning that the Bluetooth chip 120 (or the Bluetooth chip 320) has a higher priority to use the antenna 105. The reason of such a design is that because the Bluetooth chip 120 (or the Bluetooth chip 320) is very sensitive to sound signals (i.e., the human ear can easily hear small differences) when operating according to the HFP, the transmission or reception of packets by the Bluetooth chip 120 (or the Bluetooth chip 320) is prioritized (i.e., the slot allocation signal SLT is pulled up), whereas the antenna 105 is used by the WLAN chip 110 when the antenna control signal CXR is at the low level (i.e., when the Bluetooth chip 120 (or the Bluetooth chip 320) is not transmitting or receiving packets).

In some embodiments, the WLAN chip 110 can learn the current operating profile of the Bluetooth chip 120 by analyzing the waveform of the antenna control signal CXR (e.g., counting the number of level transitions in a period of time). For example, the WLAN chip 110 determines that the Bluetooth chip 120 is operating according to the HFP when the counting result is greater than a predetermined value.

Figure 8:
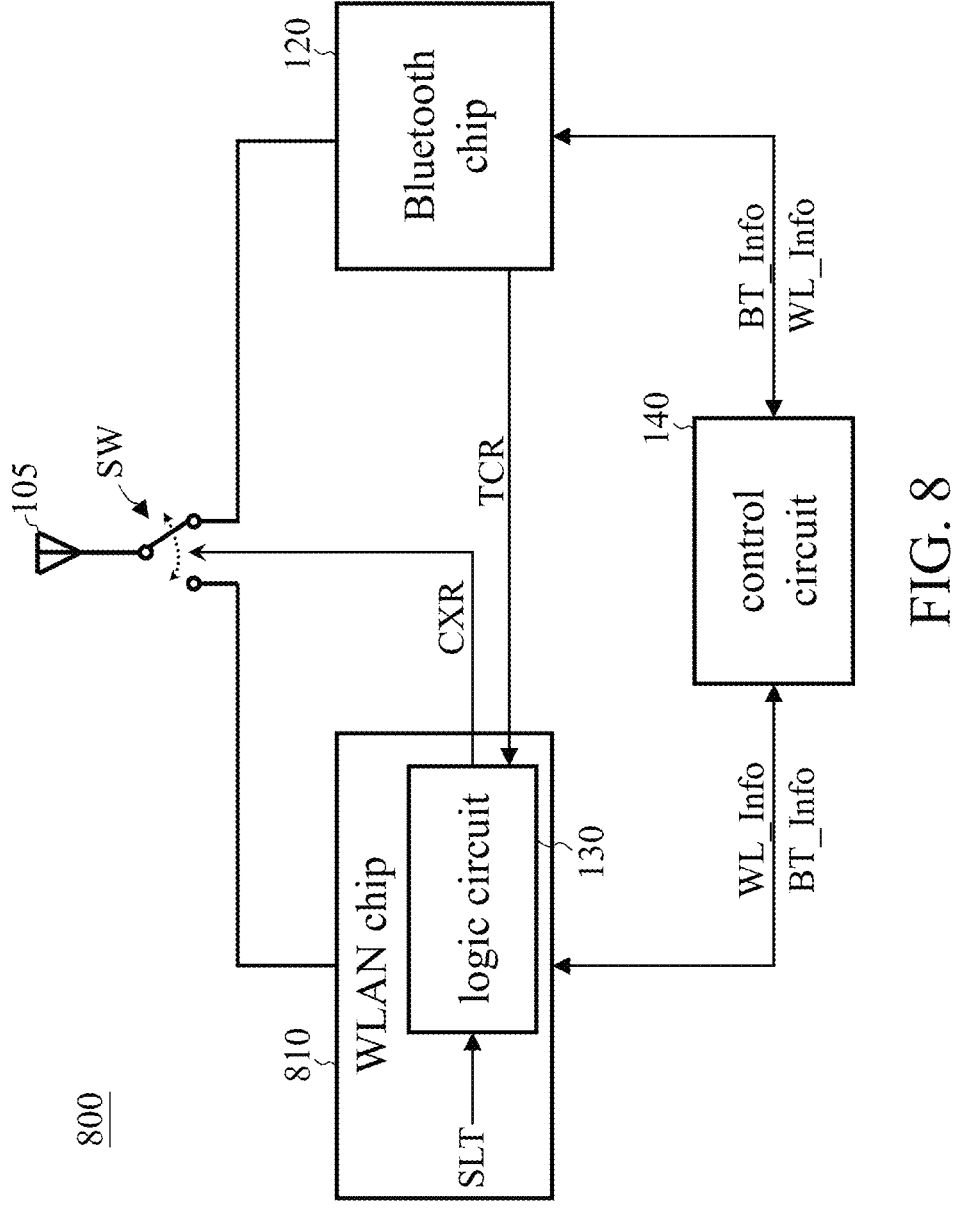
FIG. 8 is a functional block diagram of the electronic device according to another embodiment of the present invention.

FIG. 8 is a functional block diagram of the electronic device according to another embodiment of the present invention. The electronic device 800 includes a WLAN chip 810, the Bluetooth chip 120, and the control circuit 140. The electronic device 800 is similar to the electronic device 100, except that in the electronic device 800, the logic circuit 130 is integrated into the WLAN chip 810, that is, the WLAN chip 810 includes the logic circuit 130, or the WLAN chip 810 and the logic circuit 130 are packaged into a single chip.

Figure 9:
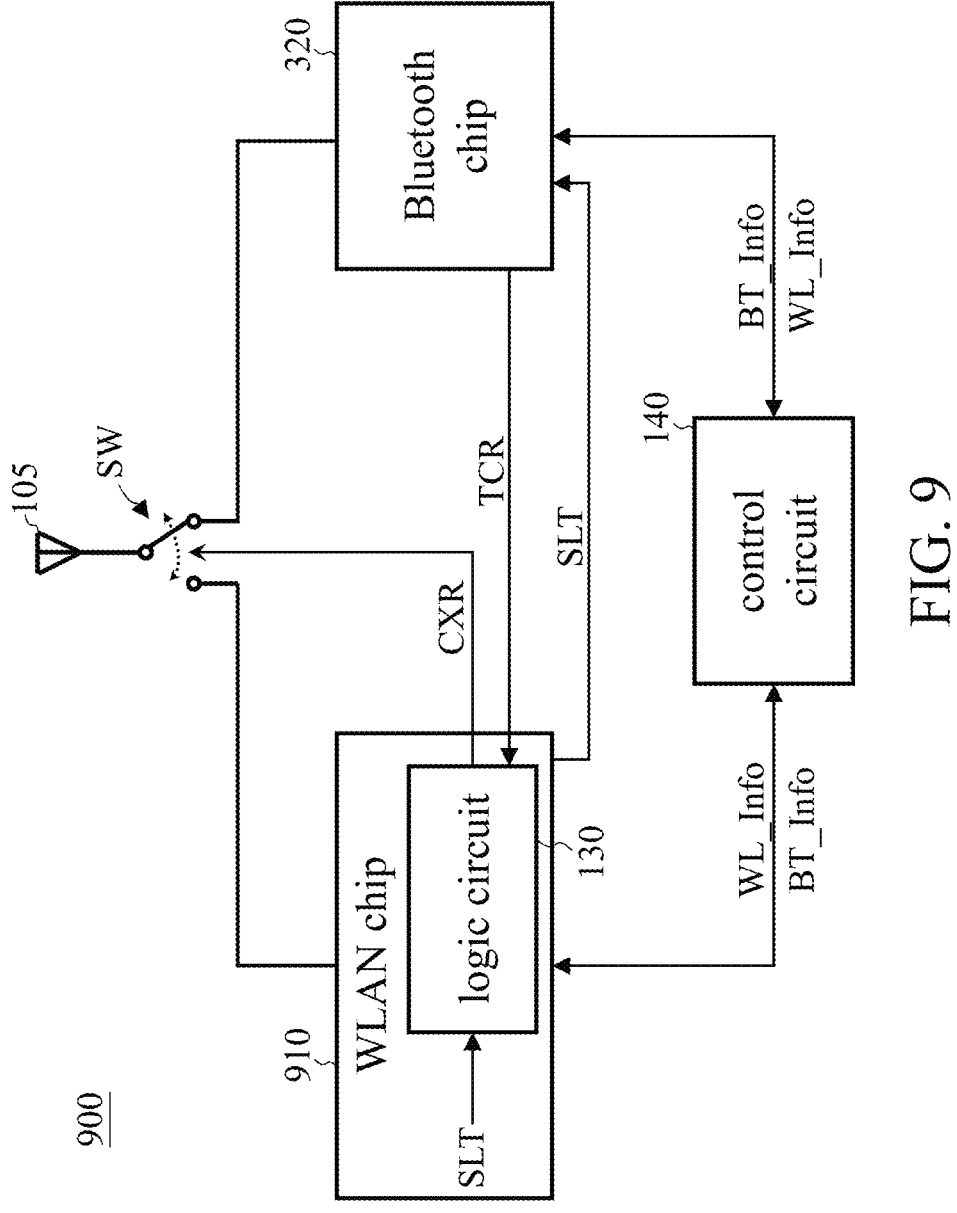
FIG. 9 is a functional block diagram of the electronic device according to another embodiment of the present invention.

FIG. 9 is a functional block diagram of the electronic device according to another embodiment of the present invention. The electronic device 900 includes a WLAN chip 910, the Bluetooth chip 320, and the control circuit 140. The WLAN chip 910 is similar to the WLAN chip 810, except that the WLAN chip 910 further outputs the slot allocation signal SLT to the Bluetooth chip 320.

Figure 10:
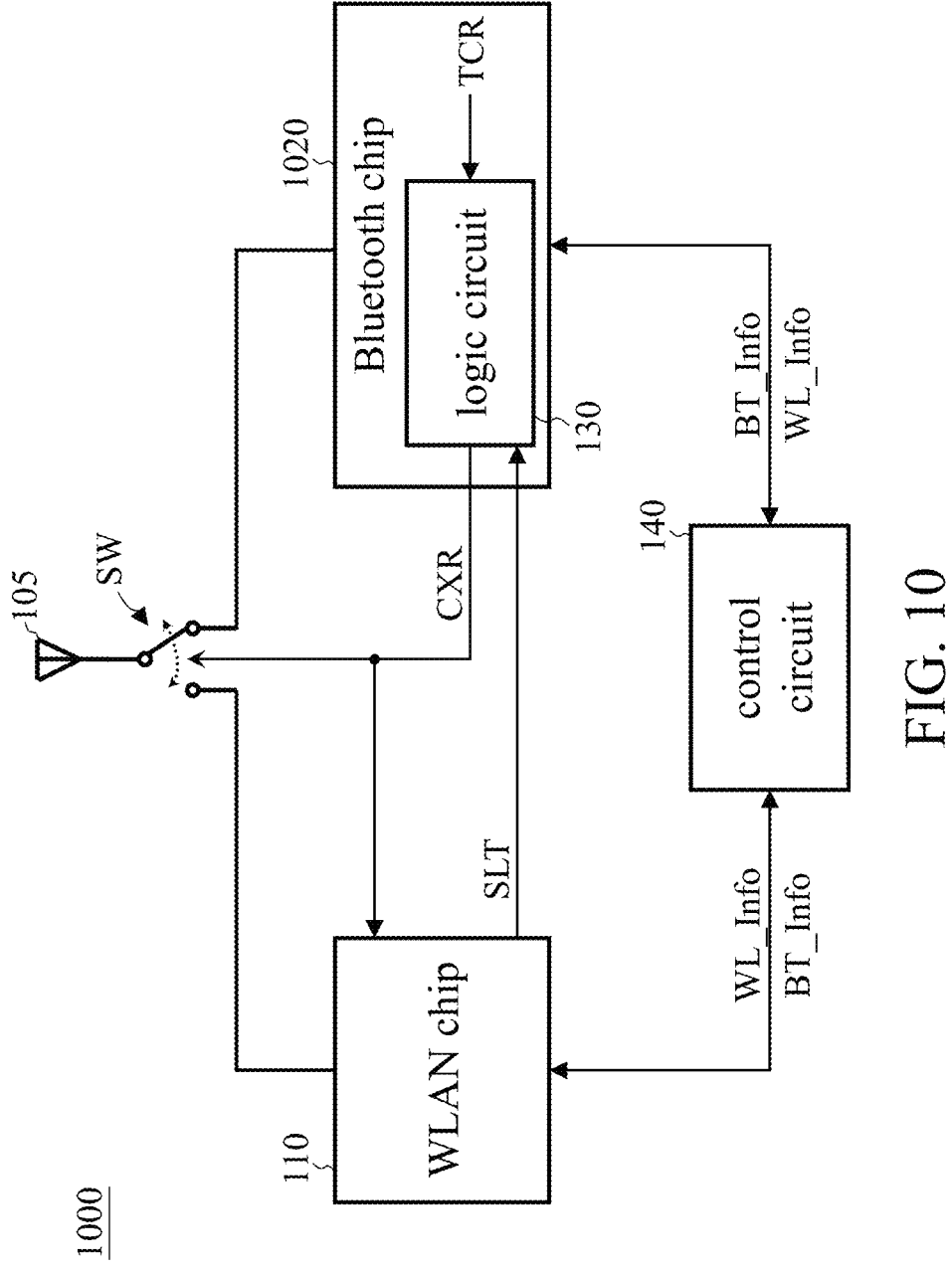
FIG. 10 is a functional block diagram of the electronic device according to another embodiment of the present invention.

FIG. 10 is a functional block diagram of the electronic device according to another embodiment of the present invention. The electronic device 1000 includes the WLAN chip 110, a Bluetooth chip 1020, and the control circuit 140. The electronic device 1000 is similar to the electronic device 100, except that in the electronic device 1000, the logic circuit 130 is integrated into the Bluetooth chip 1020, that is, the Bluetooth chip 1020 includes the logic circuit 130, or the Bluetooth chip 1020 and the logic circuit 130 are packaged into a single chip.

Figure 11:
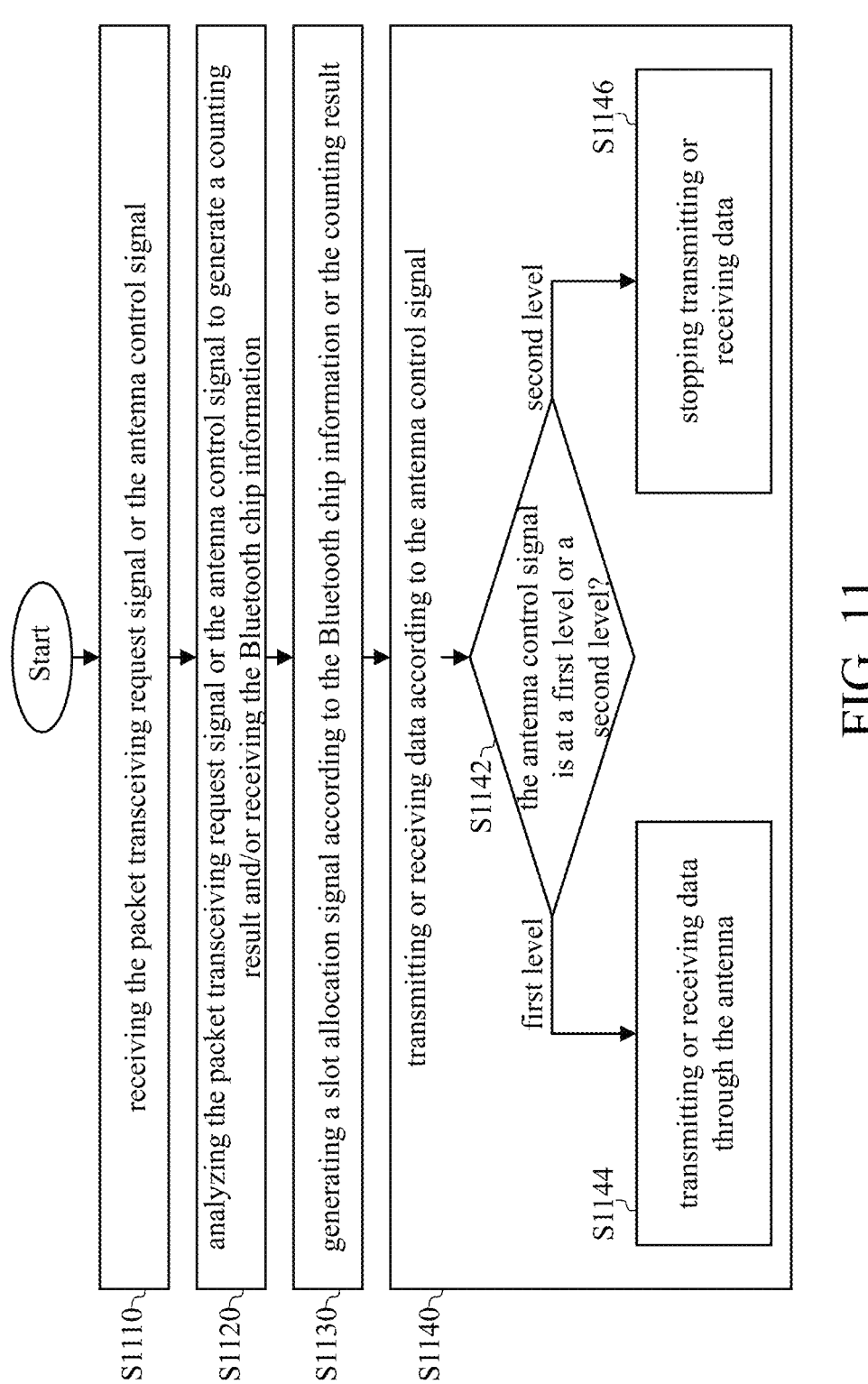
FIG. 11 is a flowchart of the operation method of a WLAN chip according to an embodiment of the present invention.

FIG. 11 is a flowchart of the operation method of the WLAN chip according to an embodiment of the present invention. The method includes the following steps.

Step S1110: The WLAN chip 110 (810 or 910) receives the packet transceiving request signal TCR or the antenna control signal CXR.

Step S1120: The WLAN chip 110 (810 or 910) analyzes the packet transceiving request signal TCR or the antenna control signal CXR to generate a counting result and/or receives the Bluetooth chip information BT_Info. In some embodiments, the counting result is the number of level transitions of the packet transceiving request signal TCR or the antenna control signal CXR within a predetermined period of time. When the counting result is greater than a predetermined value, the WLAN chip 110 (810 or 910) determines that the current operating profile of the Bluetooth chip 120 (320 or 1020) is the HFP.

Step S1130: The WLAN chip 110 (810 or 910) generates a slot allocation signal SLT according to the Bluetooth chip information or the counting result, that is, determines the number of slots in a period T and/or the level of the slot allocation signal SLT.

Step S1140: The WLAN chip 110 (810 or 910) transmits or receives data according to the antenna control signal CXR. Step S1140 includes sub-steps S1142, S1144, and S1146.

Step S1142: The WLAN chip 110 (810 or 910) determines whether the antenna control signal CXR is at a first level (e.g., low level) or a second level (e.g., high level). If the antenna control signal CXR is at the first level, the WLAN chip 110 (810 or 910) performs step S1144. If the antenna control signal CXR is at the second level, the WLAN chip 110 (810 or 910) performs step S1146.

Step S1144: The WLAN chip 110 (810 or 910) transmits or receives data through the antenna 105.

Step S1146: The WLAN chip 110 (810 or 910) stops transmitting or receiving data.

Figure 12:
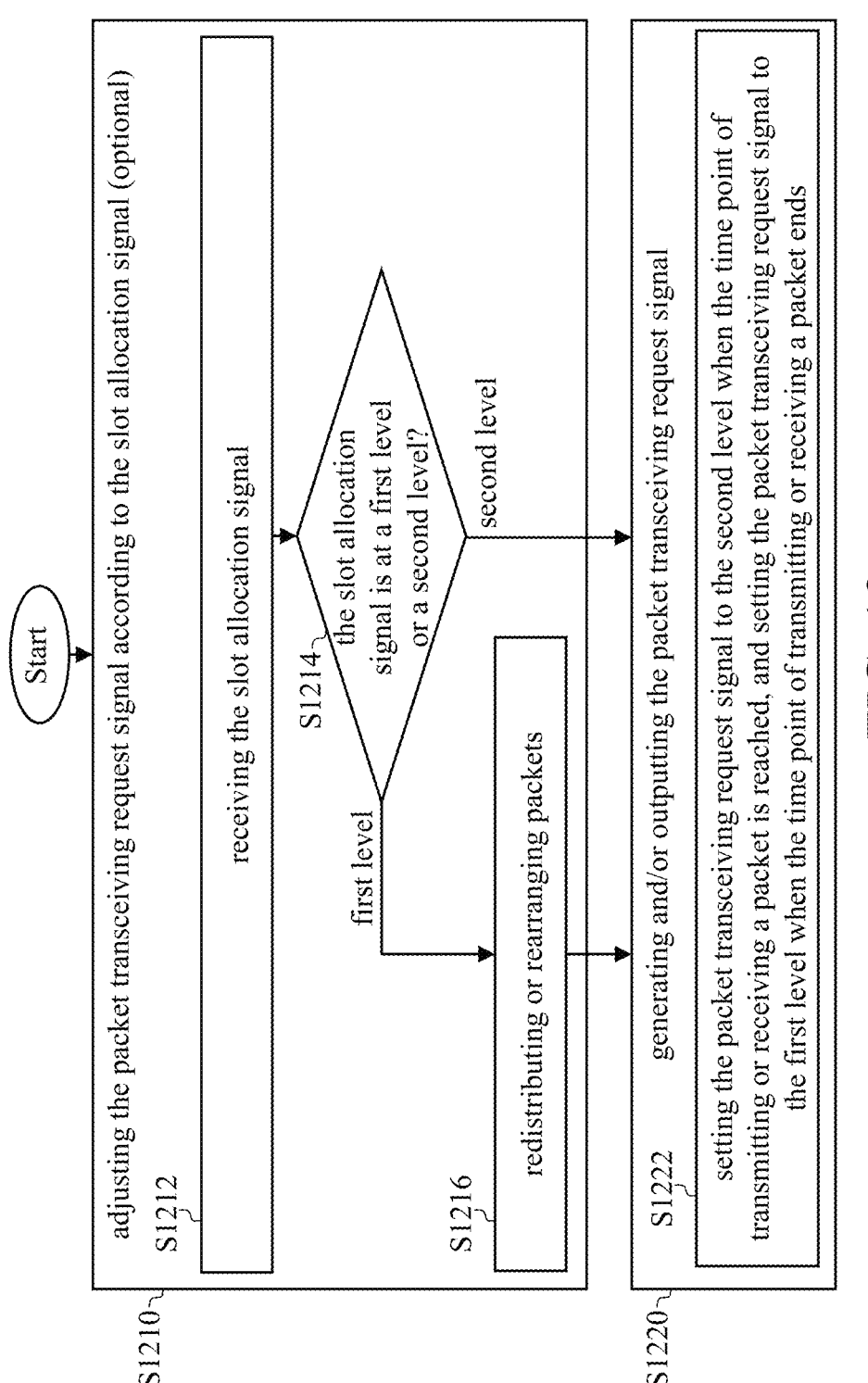
FIG. 12 is a flowchart of the operation method of a Bluetooth chip according to an embodiment of the present invention.

FIG. 12 is a flowchart of the operation method of the Bluetooth chip according to an embodiment of the present invention. The method includes step S1210 and step S1220. Step S1210 is an optional step; more specifically, in some embodiments, the Bluetooth chip 120 does not perform step S1210, while in other embodiments, the Bluetooth chip 320 and the Bluetooth chip 1020 perform step S1210.

Step S1210: The Bluetooth chip 320 (or 1020) adjusts the packet transceiving request signal TCR according to the slot allocation signal SLT. This step includes sub-steps S1212, S1214, and S1216.

Step S1212: The Bluetooth chip 320 (or 1020) receives the slot allocation signal SLT.

Step S1214: The Bluetooth chip 320 (or 1020) determines whether the slot allocation signal SLT is at a first level (e.g., low level) or a second level (e.g., high level). If the slot allocation signal SLT is at the first level, the Bluetooth chip 320 (or 1020) performs step S1216. If the slot allocation signal SLT is at the second level, the Bluetooth chip 320 (or 1020) performs step S1220.

Step S1216: The Bluetooth chip 320 (or 1020) redistributes or rearranges packets with the aim of arranging as many packets in the slot BT as possible.

Step S1220: The Bluetooth chip 120 (320 or 1020) generates and/or outputs the packet transceiving request signal TCR. This step includes sub-step S1222.

Step S1222: The Bluetooth chip 120 (320 or 1020) sets the packet transceiving request signal to the second level when the time point of transmitting or receiving a packet is reached, and the Bluetooth chip 120 (320 or 1020) sets the packet transceiving request signal to the first level when the time point of transmitting or receiving the packet ends. Reference is made to FIG. 2 and FIGS. 4-7 for the waveforms of the packet transceiving request signal TCR.

FIG. 13 is a flowchart of an antenna control method according to an embodiment of the present invention. The method includes the following steps.

Step S1310: When the slot allocation signal SLT corresponds to a first slot (e.g., the slot WL), the logic circuit 130 electrically connects the antenna 105 to a first communication chip (e.g., the WLAN chip 110, 810, or 910) and does not electrically connect the antenna 105 to a second communication chip (e.g., the Bluetooth chip 120, 320, or 1020). In some embodiments, the first communication chip and the second communication chip are communication chips of different types.

Step S1320: Electrically connecting the antenna 105 to the second communication chip and not electrically connecting it to the first communication chip when the slot allocation signal SLT corresponds to a second slot (e.g., the slot BT) and the packet transceiving request signal TCR indicates that the second communication chip is transmitting or receiving a packet.

Step S1330: Electrically connecting the antenna 105 to the first communication chip and not electrically connecting it to the second communication chip when the slot allocation signal SLT corresponds to the second slot and the packet transceiving request signal TCR indicates that the second communication chip is not transmitting or receiving a packet.

In some embodiments, the WLAN chip 110, the WLAN chip 810, the WLAN chip 910, the Bluetooth chip 120, the Bluetooth chip 320, and the Bluetooth chip 1020 are not coupled and electrically connected other antennas except for the antenna 105.

In some embodiments, the control circuit 140 is a main control circuit of the electronic device 100, 300, 800, 900, or 1000; for example, the control circuit 140 is a processor or microcontroller of a smart watch, a smart band, or a smart gateway. The control circuit 140 can be a circuit or an electronic component with program execution capability, such as a central processing unit, a microprocessor, a microprocessor unit, a digital signal processor (DSP), an Application Specific Integrated Circuit (ASIC), or an equivalent thereof. The control circuit 140 can implement the main functions of the electronic device 100, 300, 800, 900, or 1000 by executing program codes and/or program instructions.

The above-mentioned first level and second level are for illustrative purposes only, not for limiting the scope of the present invention. People having ordinary skill in the art can replace the high/low level with low/high level based on the foregoing discussions.

Although the above-disclosed embodiments take WLAN as an example, this is not a limitation to the present invention. People having ordinary skill in the art can apply the present invention to other types of wireless communication protocols, such as Thread or Zigbee, according to the disclosure of the present invention.

Since a person having ordinary skill in the art can appreciate the implementation detail and the modification thereto of the present method invention through the disclosure of the device invention, repeated and redundant description is thus omitted. The shape, size, and ratio of any element in the disclosed figures are exemplary for understanding, not for limiting the scope of this invention. Furthermore, there is no step sequence limitation for the method inventions as long as the execution of each step is applicable. In some instances, the steps can be performed simultaneously or partially simultaneously.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. An electronic device, comprising:
   an antenna;
   a line switching circuit coupled to the antenna;
   a first communication chip coupled to the antenna through the line switching circuit and configured to generate a slot allocation signal;
   a second communication chip coupled to the antenna through the line switching circuit and configured to generate a packet transceiving request signal, wherein the first communication chip and the second communication chip are communication chips of different types; and a logic circuit coupled to the first communication chip and the second communication chip and configured to control the line switching circuit according to the slot allocation signal and the packet transceiving request signal.

2. The electronic device of claim 1, wherein the slot allocation signal comprises a first slot and a second slot, the first communication chip uses the antenna in the first slot, and the second communication chip does not use the antenna in the first slot.

3. The electronic device of claim 2, wherein in the second slot, the logic circuit switches the antenna to the first communication chip when the packet transceiving request signal is at a first level, and switches the antenna to the second communication chip when the packet transceiving request signal is at a second level, the first level being different from the second level.

4. The electronic device of claim 2, wherein the first slot corresponds to a first level of the slot allocation signal, the second slot corresponds to a second level of the slot allocation signal, the first level is different from the second level, and the first slot and the second slot appear alternately.

5. The electronic device of claim 2, wherein the first communication chip is a wireless local area network (WLAN) chip, the second communication chip is a Bluetooth chip, and a length of the first slot is not fixed.

6. The electronic device of claim 1, wherein the first communication chip generates the slot allocation signal according to a beacon reception time.

7. The electronic device of claim 1 further comprising:

a control circuit coupled to the first communication chip and the second communication chip and configured to transmit a current operating profile of the second communication chip to the first communication chip;

wherein the first communication chip generates the slot allocation signal according to the current operating profile.

8. The electronic device of claim 1, wherein the slot allocation signal comprises a first slot and a second slot, and the second communication chip moves a packet that is originally scheduled in the first slot for transmission or reception to the second slot for transmission or reception, the second slot being later than the first slot.

9. The electronic device of claim 1, wherein the logic circuit is integrated in the first communication chip.

10. The electronic device of claim 1, wherein the logic circuit is integrated in the second communication chip.

11. The electronic device of claim 1, wherein the first communication chip and the second communication chip are not coupled and electrically connected to other antennas.

12. An antenna control method of switching an antenna to a first communication chip or a second communication chip, the first communication chip outputting a slot allocation signal comprising a first slot and a second slot, the second communication chip outputting a packet transceiving request signal, the first communication chip and the second communication chip being communication chips of different types, the method comprising:

electrically connecting the antenna to the first communication chip and not electrically connecting the antenna to the second communication chip when the slot allocation signal corresponds to the first slot; and electrically connecting the antenna to the second communication chip and not electrically connecting the antenna to the first communication chip when the slot allocation signal corresponds to the second slot and the packet transceiving request signal indicates that the second communication chip is transmitting or receiving a packet.

13. The method of claim 12 further comprising:

electrically connecting the antenna to the first communication chip and not electrically connecting the antenna to the second communication chip when the slot allocation signal is the second slot and the packet transceiving request signal indicates that the second communication chip is not transmitting or receiving the packet.

14. The method of claim 12, wherein the first communication chip is a wireless local area network (WLAN) chip, and the second communication chip is a Bluetooth chip.

15. The method of claim 12, wherein a length of the first slot is not fixed.

16. The method of claim 12, wherein the first slot corresponds to a first level of the slot allocation signal, the second slot corresponds to a second level of the slot allocation signal, the first level is different from the second level, and the first slot and the second slot appear alternately.

* * * * *